(12) United States Patent
Rousseau et al.

(10) Patent No.: US 6,171,487 B1
(45) Date of Patent: Jan. 9, 2001

(54) DUAL-FLOW FILTER FOR BIOLOGICAL EFFLUENT PURIFICATION

(75) Inventors: Nicolas Rousseau, Suresnes; Jacques Moles, Rueil-Malmaison; Jean-Louis Vital, Boulogne-Billancourt, all of (FR)

(73) Assignee: Degremont, Rueil Malmaison (FR)

( * ) Notice: Under 35 U.S.C. 154(b), the term of this patent shall be extended for 0 days.

(21) Appl. No.: 09/155,575

(22) PCT Filed: Mar. 24, 1997

(86) PCT No.: PCT/FR97/00516

§ 371 Date: Oct. 1, 1998

§ 102(e) Date: Oct. 1, 1998

(87) PCT Pub. No.: WO97/36830

PCT Pub. Date: Oct. 9, 1997

(30) Foreign Application Priority Data

Apr. 2, 1996 (FR) .................................................. 96 04120

(51) Int. Cl.⁷ .................................................... B01D 35/00
(52) U.S. Cl. ...................... 210/203; 210/220; 210/221.2; 210/258; 210/416.1
(58) Field of Search ............................... 210/221.2, 620, 210/610, 199, 201, 203, 252, 264, 283, 284, 293, 220, 258, 416.1, 416.2, 416.3

(56) References Cited

U.S. PATENT DOCUMENTS 3,807,565 * 4/1974 Langston et al. .................... 210/201
3,926,588 * 12/1975 Speece ................................. 210/102
4,795,557 * 1/1989 Bourbigot et al. ................. 210/221.2
5,080,793 * 1/1992 Urlings .................................. 210/603

FOREIGN PATENT DOCUMENTS

661264 A5 * 7/1987 (CH) .
4103402 C1 * 2/1992 (DE) .

OTHER PUBLICATIONS

"Gas–in–Liquid Dispersions, " Chemical Engineers' Handbook, 5th ed., McGraw–Hill Book Company, New York, 1973, pp. 18/67–73.*

* cited by examiner

Primary Examiner—Chester T. Barry
(74) Attorney, Agent, or Firm—Pollock, Vande Sande & Amernick

(57) ABSTRACT

Dual-flow filter for the biological purification of effluents, particularly water, comprising at least two filtration cells, arranged in series, in fluid communication, with one another so that the effluent to be treated passes through them successively, these two cells being separated by an intermediate box provided with aeration means, wherein the first filtration cell is of the ascending flow type and the second filtration cell is of the descending flow type, and the aeration in the intermediate box takes place countercurrentwise with respect to the liquid flow moving through the box, with a movement of the flows guided with the aid of a siphon partition.

19 Claims, 2 Drawing Sheets

DUAL-FLOW FILTER FOR BIOLOGICAL EFFLUENT PURIFICATION

FIELD OF THE INVENTION

This invention relates to a twin-flow filter for the biological purification of biological effluents, in particular water.

BACKGROUND OF THE INVENTION

It is known that various pollutant substances (ammoniacal nitrogen, carbon-based substances, etc.) contained in effluents, in particular in water, can be removed biologically. Some of the reactions—aerobic thus used are carried out by means of atmospheric oxygen and they thus require an external supply of oxygen in as much as this oxygen is not already present in the water to be treated.

Many processes and devices are known which make it possible to carry out such a biological removal in the presence of oxygen. Thus, with this aim, reactors, filters or biofilters are used.

Reactors simultaneously carry out the supplying with oxygen and the provision of physical supports for the growth and maintenance of the bacteria.

Filters use oxygen already present in the water and their filtering material serves as a support for the growth and maintenance of the bacteria. In addition to the biological reaction, filters ensure the usual functions of retention of the matter in suspension, followed by its removal during washing.

Biofilters combine the functions carried out by reactors and filters.

Thus, the production of biofilters requires the combination, in the same chamber, of all the functions required for the removal of pollutant substances biologically: bacteria-supporting functions, aerating functions and washing functions. It is seen that such a combination can lead to a complex and thus expensive production, as regards both the manufacturing costs and the operating and maintenance costs. Moreover, the internal aeration used in biofilters leads to stirring of the bed of granular material and this stirring can be detrimental to the formation of the biomass on the granular material which serves as a support for it. The internal aeration can also be detrimental, for the same reasons, to the quality of the filtered water.

BRIEF DESCRIPTION OF THE INVENTION

Consequently, the present invention proposes to provide a device for the biological removal of pollutant substances contained, in particular, in raw water to be treated, which, in a particularly cost-effective manner, advantageously combines the various functions recalled above, allowing this biological removal to be achieved. The invention is based on an embodiment of water-treatment filters known as twin-flow filters. It will be recalled that these filters consist of two filtration cells through which flows pass in series. The first cell has an ascending flow passing through it and the second cell has a descending flow passing through it. An embodiment of such a twin-flow filter is disclosed in German patent DE-A-2,355,422. This type of filter is used in particular as an active-charcoal filter.

A system of two filters arranged in series, both operating with a movement of the flow directed from the top downwards, is also known from Swiss patent CH-A-661,264, these two filters being separated by an intermediate box fitted with aeration means.

Starting from this state of the art, the present invention provides a twin-flow filter for the biological purification of effluents, in particular water, comprising at least two filtration cells, arranged in series, in hydraulic connection, such that the effluent to be treated passes through them successively, these two cells being separated by an intermediate box provided with aeration means, characterized in that the first filtration cell is of the ascending flow type and the second filtration cell is of the descending flow type, and in that the aeration in the said intermediate box takes place countercurrentwise with respect to the liquid flow moving through the said box, with a movement of the flows directed with the aid of a siphoning partition.

The invention is also directed towards a twin-flow filter for the biological purification of effluents, in particular water, comprising at least two filtration cells arranged in series and in hydraulic connection, such that the effluent to be treated passes through them successively, the cells being separated, respectively, by an intermediate box provided with aeration means, characterized in that it includes n filtration cells, through which the effluent to be treated passes successively, and n−1 intermediate boxes, each comprising the aeration means, each intermediate box being placed between two successive filtration cells and having the effluent to be treated pass through it, either with a movement of the flows directed by means of a siphoning partition, or with an ascending flow.

Thus, according to the invention, the channel located between the two cells (and which is generally used to recover the washing waters) is used to carry out an intermediate aeration and thus to increase the reaction yields on the second cell. In addition, this arrangement in accordance with the invention makes it possible to carry out the aeration without in any way disrupting the filtration processes which take place in the cells.

According to the invention, the intermediate box can be used in order to inject reagents capable of improving the biological activity (in particular nutrient of phosphate or trace element type, etc.). This same intermediate box can be used to carry out a continuous injection, for example of ammonium salts, in order to conserve a minimum amount of active biomass, in the absence of nitrogenous pollution, this injection being stopped in the event of the appearance of peaks of pollution to be nitrified. The addition can be carried out via diffusion and mixing means.

According to the invention, the aeration means can be made in the form of a diffuser, such as a static or dynamic mixer. They can also be of the type made of a rigid porous material or of the type with a porous membrane.

The aeration means can use air or pure oxygen.

Other characteristics and advantages of the present invention will become apparent from the description given below with reference to the attached drawings, which illustrate embodiments thereof without any limiting nature.

DETAILED DESCRIPTION OF THE INVENTION

Figure 1:
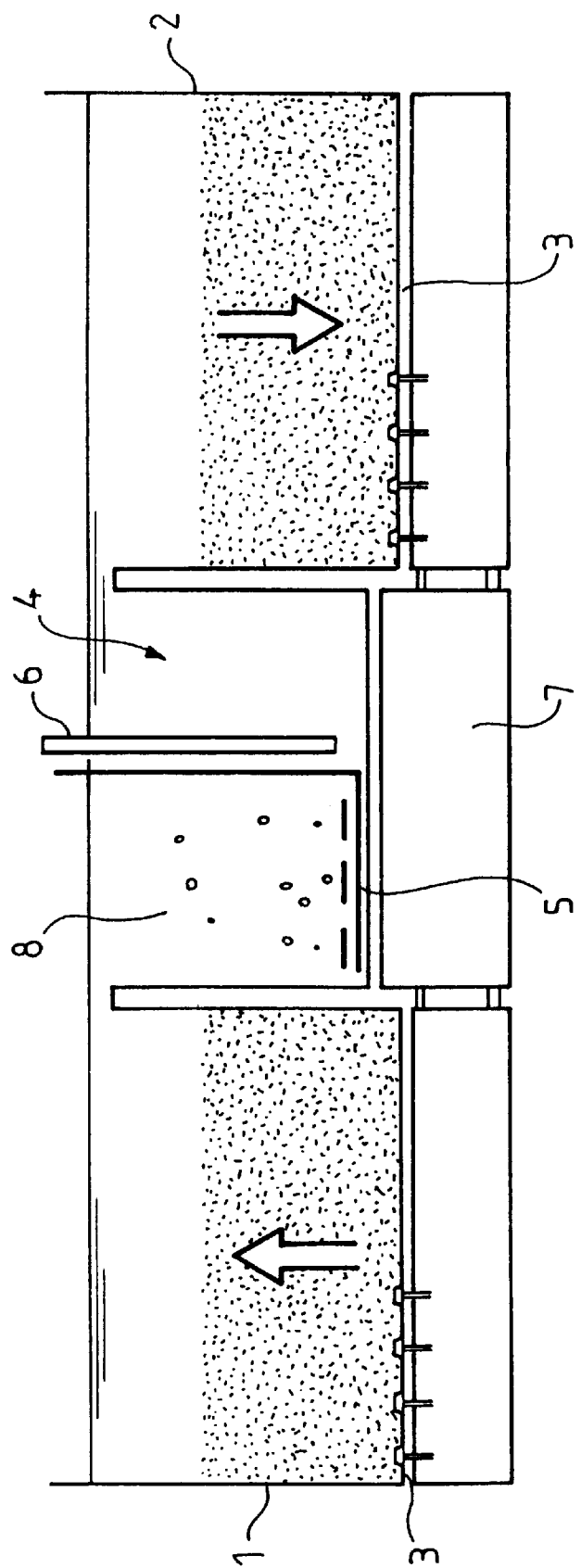
FIG. 1 is a diagrammatic view in transverse section of an embodiment of a twin-flow filter according to the present invention.

As can be seen in FIG. 1, in this embodiment, the twin-flow filter according to the invention includes a first filtration cell 1 comprising, as known, a floor with nozzles 3 for the introduction of the effluent to be treated, this effluent moving through this cell in an ascending manner as indicated by the arrow. The filter includes a second cell 2 of the same type as the first, through which the effluent to be treated moves with a descending flow. According to the invention, an intermediate box 4 is placed between the cells 1 and 2 so that the effluent to be treated moves in series between the first cell, this intermediate box and the second cell. This intermediate box includes aeration means represented diagrammatically here by a diffuser 5. As specified above, these means, of known type, can consist of a static or dynamic mixer or can be of the type made of a rigid porous material or of the type with a porous membrane. The aeration device 5 can use air or pure oxygen.

In the embodiment illustrated in FIG. 1, the flow in the intermediate box 4 is directed by means of a siphoning partition 6, the flow rates being chosen so as to allow optimum exchange between the oxygenation gas introduced into the aeration zone 8 by the aeration means 5 and the effluent, for example the water to be treated.

The box 7 for washing the filters has been provided under the intermediate box 4, this arrangement being standard on twin-flow filters. Thus, according to the invention, the chamber below the intermediate box is used to recover the washing waters from two filtration cells 1 and 2.

Figure 2:
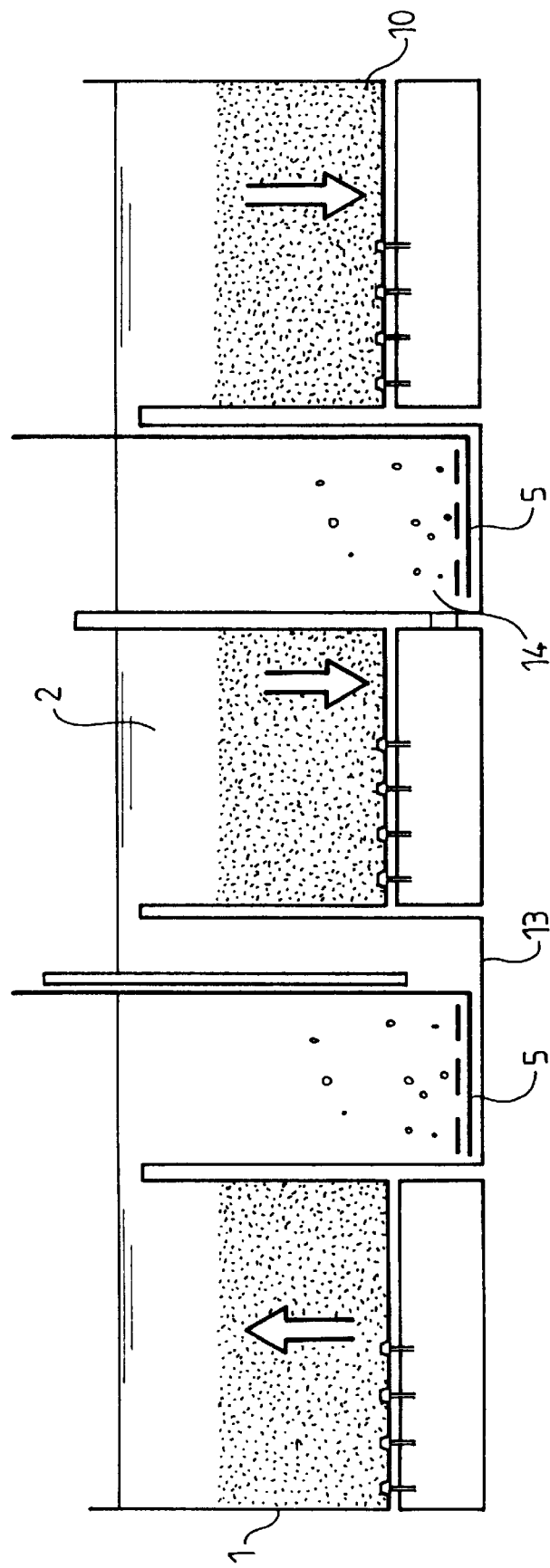
FIG. 2 is a diagrammatic view similar to that of FIG. 1, illustrating a second embodiment of a twin-flow filter according to the invention.

In the embodiment illustrated in FIG. 2, the twin-flow filter includes three filtration cells 1, 2 and 10 arranged in series and through which the effluent to be treated passes successively, each of these cells being of the same type as those described above. As can be seen in this figure, an intermediate box, 13 or 14 respectively, has been provided between two successive cells, each comprising its aeration means 5 as described above with reference to FIG. 1.

This same arrangement can be generalized to n filtration cells, also arranged in series, and in this case n−1 intermediate boxes are provided with their aeration means, each of these intermediate boxes being placed between two successive cells.

As has already been mentioned above, the aeration zone of the intermediate box can be used to add reagents which allow the biological activity to be improved, or to add a dopant, this addition being carried out with the aid of means such as a diffusion system or mixer systems of standard type.

An embodiment of the twin-flow filter according to the invention has been given below. Needless to say, this example is again given merely as a guide and has no limiting nature.

The water to be treated, comprising a certain concentration of dissolved oxygen (for example the saturation value at 15° C., i.e. 9 mg $O_2$/l), is introduced into the first cell. This water also comprises 3 ppm of $NH_4^+$. The biological reaction makes it possible, without an additional supply of oxygen, to remove (at best) slightly less than two-thirds of the amount of $NH_4^+$ entering. The water thus leaves the first cell with about 1 ppm of $NH_4^+$ and about 1 ppm of dissolved oxygen.

Aeration is carried out in the intermediate box, after the first cell of the filter, by means of porous membranes arranged at regular intervals at the bottom of the box. These porous membranes distribute a flow of gas consisting of air bubbles about 2 mm in diameter. This aeration adds to the water about 60% of the value of the oxygen concentration at saturation and thus allows the biological reaction to remove the remaining amount of $NH_4^+$.

This example clearly demonstrates the efficacy of the filter according to the present invention, it being possible for this filter to be used in a particularly cost-effective manner, as emerges from reading the description hereinabove.

Needless to say, the present invention is not limited to the embodiments described and/or represented, but encompasses all the variants thereof which fall within the context of the scope of the attached claims.

What is claimed is:

1. A dual-flow filter for the biological purification of aqueous effluent, comprising at least two filtration cells arranged in series in fluid communication with one another so that the effluent to be treated passes through them successively, these two cells being separated by an intermediate box provided with aeration means, wherein the first filtration cell is of the ascending flow type and the second filtration cell is of the descending flow type, and the aeration in the said intermediate box takes place countercurrentwise with respect to the liquid flow moving through the said box, with a movement of the flows guided with the aid of a siphon partition.

2. The dual-flow filter according to claim 1 wherein said intermediate box comprising the aeration means includes a portion for recovering washing waters from the two filtration cells between which the intermediate box is placed.

3. The dual-flow filter according to claim 1, wherein the aeration means for the intermediate box are of the type made of a rigid porous material.

4. The dual-flow filter according to claim 1, wherein the aeration means for the intermediate box are made in the form of a diffuser.

5. The dual-flow filter according to claim 1, wherein the aeration means for the intermediate box are of the type with a porous membrane.

6. The dual-flow filter according to claim 1, wherein the aeration means use air or pure oxygen.

7. The dual-flow filter according to claim 1 wherein the said intermediate box comprises diffusion and mixing means allowing the addition of reagents in the aeration zone of the said box.

8. The dual-flow filter according to claim 7, wherein the said intermediate box comprises means for injecting nutrients of phosphate or trace element type nutrients.

9. The dual-flow filter according to claim 7, wherein the said intermediate box comprises means for carrying out a continuous injection in order to maintain a minimum amount of active biomass in the absence of nitrogenous pollution, the injection means ceasing injection in the event of the appearance of peaks of pollution to be nitrified.

10. A dual-flow filter for the biological purification of aqueous effluent, comprising at least two filtration cells arranged in series and in fluid communication with one another so that the effluent to be treated passes through them successively, the said cells being separated, respectively, by an intermediate box provided with aeration means, said filter comprising n filtration cells through which the effluent to be treated passes successively, and n−1 intermediate boxes, each comprising the said aeration means, each intermediate box being placed between two successive filtration cells and the effluent to be treated passing through it, wherein said intermediate box comprising the aeration means includes a portion for recovering washing waters from the two filtration cells between which it is placed.

11. The dual-flow filter according to claim 10, wherein the aeration means for the intermediate boxes are of the type made of a rigid porous material.

12. The dual-flow filter according to claim 10, wherein the aeration means for the intermediate boxes are made in the form of a diffuser.

13. The dual-flow filter according to claim 10, wherein the aeration means for the intermediate boxes are of the type with a porous membrane.

14. The dual-flow filter according to claim 10, wherein the aeration means use air or pure oxygen.

15. The dual-flow filter according to claim 10 wherein the movement of the flows of the effluent to be treated passing through the intermediate boxes is guided by means of a siphon partition.

16. The dual-flow filter according to claim 10 wherein the movement of the flows of the effluent to be treated passing through the intermediate boxes is guided by mean of an ascending flow.

17. The dual-flow filter according to claim 10, wherein each intermediate box comprises diffusion and mixing means allowing the addition of reagents in the aeration zone of the said box.

18. The dual-flow filter according to claim 17, wherein each intermediate box comprises means for injecting nutrients of phosphate or trace element type nutrients.

19. The dual-flow filter according to claim 17, wherein each intermediate box comprises means for carrying out a continuous injection in order to maintain a minimum amount of active biomass in the absence of nitrogenous pollution, the injection means ceasing injection in the event of the appearance of peaks of pollution to be nitrified.

* * * * *